United States Patent
Peng et al.

(10) Patent No.: US 9,350,164 B2
(45) Date of Patent: May 24, 2016

(54) SURGE PROTECTION CIRCUIT

(71) Applicant: HUAWEI TECHNOLOGIES CO., LTD., Shenzhen, Guangdong (CN)

(72) Inventors: Xuewen Peng, Shenzhen (CN); Wenzong Cao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 14/145,067

(22) Filed: Dec. 31, 2013

(65) Prior Publication Data

US 2014/0111895 A1    Apr. 24, 2014

Related U.S. Application Data

(63) Continuation of application No. PCT/CN2013/070318, filed on Jan. 10, 2013.

(30) Foreign Application Priority Data

Jan. 20, 2012 (CN) .......................... 2012 1 0019017

(51) Int. Cl.
*H02H 9/04* (2006.01)
*H02H 3/22* (2006.01)
(Continued)

(52) U.S. Cl.
CPC .............. *H02H 9/025* (2013.01); *H02H 9/041* (2013.01); *H02H 9/047* (2013.01); *H02H 11/002* (2013.01); *H02H 1/04* (2013.01); *H02H 9/005* (2013.01)

(58) Field of Classification Search
CPC ............................... H02H 9/046; H02H 9/005

USPC ........................................................ 361/111
See application file for complete search history.

(56) References Cited

U.S. PATENT DOCUMENTS 6,304,422 B1    10/2001  Sander et al.
6,347,026 B1    2/2002   Sung et al.
(Continued)

FOREIGN PATENT DOCUMENTS

CN    1438706    8/2003
CN    1829027    9/2006
(Continued)

OTHER PUBLICATIONS

Chinese Office Action dated Oct. 22, 2013 in corresponding Chinese Patent Application No. 201210019017.2.
(Continued)

*Primary Examiner* — Dharti Patel
(74) *Attorney, Agent, or Firm* — Staas & Halsey LLP

(57) ABSTRACT

A surge protection circuit, related to the power electronics field. The surge protection circuit includes: an input configured to provide direct current power supply, an output configured to connect to a next circuit, and a cutoff circuit connected to the output; the surge protection circuit further includes: a discharge circuit connected between the input and the cutoff circuit; the discharge circuit includes: a diode and a field-effect transistor; the cathode of the diode is connected to the positive end of the input, and the anode of the diode is connected to the source of the field-effect transistor; the gate of the field-effect transistor is connected to the positive end of the input, the drain of the field-effect transistor is connected to the negative end of the input, and the direction of the parasitic diode of the field-effect transistor is opposite to the direction of the diode.

4 Claims, 3 Drawing Sheets

(51) Int. Cl.
*H02H 9/02* (2006.01)
*H02H 11/00* (2006.01)
*H02H 1/04* (2006.01)
*H02H 9/00* (2006.01)

(56) References Cited

U.S. PATENT DOCUMENTS

| | | | |
|---|---|---|---|
| 6,963,183 B1 | 11/2005 | Kessler et al. | |
| 8,385,032 B1* | 2/2013 | Mao | H02M 1/4225 361/111 |
| 8,614,866 B2* | 12/2013 | Billingsley | H01H 9/542 361/8 |
| 8,830,649 B2* | 9/2014 | Oppermann | H01F 7/1811 361/152 |
| 2003/0151865 A1 | 8/2003 | Maio | |
| 2003/0214769 A1 | 11/2003 | Nishikawa et al. | |
| 2006/0152877 A1 | 7/2006 | Buzzard et al. | |
| 2006/0181156 A1 | 8/2006 | Titschert et al. | |
| 2007/0091528 A1* | 4/2007 | Yamashita | B60L 3/0046 361/93.1 |
| 2008/0013233 A1 | 1/2008 | Otake et al. | |
| 2008/0192396 A1* | 8/2008 | Zhou | H02H 3/207 361/86 |
| 2008/0258224 A1 | 10/2008 | Hshieh | |
| 2012/0249012 A1* | 10/2012 | Xu | H05B 33/0815 315/291 |
| 2014/0118876 A1* | 5/2014 | Cook | H02H 9/025 361/93.9 |

FOREIGN PATENT DOCUMENTS

| | | |
|---|---|---|
| CN | 101079546 | 11/2007 |
| CN | 101106127 | 1/2008 |
| CN | 201256290 | 6/2009 |
| CN | 101908762 | 12/2010 |
| CN | 102130595 | 7/2011 |
| CN | 102593810 | 7/2012 |
| DE | 19732094 | 1/1999 |
| EP | 0918389 | 5/1999 |
| WO | 2011/038993 | 4/2011 |

OTHER PUBLICATIONS

PCT International Search Report and Written Opinion of the International Searching Authority dated Apr. 18, 2013 in corresponding International Patent Application No. PCT/CN2013/070318.
Extended European Search Report, dated Jul. 2, 2014, in corresponding European Application No. 13738500.1 (7 pages).
International Search Report, dated Apr. 18, 2013, in corresponding International Application No. PCT/CN2013/070318 (6 pp.).

\* cited by examiner

SURGE PROTECTION CIRCUIT

CROSS-REFERENCE TO RELATED APPLICATIONS

This application is a continuation of International Application No. PCT/CN2013/070318, filed on Jan. 10 2013, which claims priority to Chinese Patent Application No. 201210019017.2, filed on Jan. 20 2012, both of which are hereby incorporated by reference in their entireties.

TECHNICAL FIELD

Embodiments of the present invention relate to the power electronics field, and in particular, to a surge protection circuit.

BACKGROUND

Currently, in a direct current power supply input system or a related electronics system, to prevent negative surge from damaging a next circuit and an equipment, a surge protection circuit is set between a direct current input and the next circuit, to cut off power supply to the next circuit timely in the case of negative surge, discharge a surge current using a varistor resistor (VR) or a transient voltage suppressor (TVS), so as to achieve surge protection for the next circuit.

Specifically, as shown in FIG. 1(a), a surge protection circuit includes a cutoff circuit and a discharge circuit, where the cutoff circuit is implemented as follows in detail: a diode D1 and a diode D2 are set at the positive end and negative end of a direct current input, respectively, the anode of D1 is connected to the positive end of the direct current input, and the cathode of D2 is connected to the negative end of the direct current input; a capacitor C is set between the diodes D1 and D2 and a next circuit, and two ends of the capacitor C are connected to the cathode of D1 and the anode of D2, respectively. Of course, as shown in FIG. 1(b), diodes D1 and D2 of the cutoff circuit may also be replaced by field-effect transistors M1 and M2. The discharge circuit is a VR or TVS connected between the positive end and the negative end of the direct current input.

A working principle of a surge protection circuit in the prior art is: in the case of normal working, diodes (or field-effect transistors) of a cutoff circuit are in a forward conductive status, and a current flows from the positive end of direct current input, through a next circuit, to the negative end of the direct current input. When negative surge occurs, the current flows from the negative end to the positive end temporarily; at this time, D1 and D2 (or M1 and M2) are cut off reversely, to achieve a cutoff function and protect the next circuit. A VR can adjust resistance according to a voltage and discharge a surge current; a TVS can convert the surge current into heat for dissipation to achieve a discharge purpose.

However, taking FIG. 1(a) as an example, after diodes D1 and D2 are cut off, they withstand a high reverse voltage (the reverse voltage is equal to a sum of a clamping voltage of a varistor resistor and a voltage of a capacitor C). For example, for the direct current input ranging from 38.4 V to 72 V, because the clamping voltage of the varistor resistor is as high as about 130 V, D1 and D2 withstand a reverse voltage that is normally above 170 V. Therefore, a diode or field-effect transistor of a cutoff circuit may only be a model with a high specification; a high clamping voltage seriously restricts model selection of an electronic equipment, and the high clamping voltage easily causes diodes D1 and D2 (or field-effect transistors M1 and M2) to lose effect or be damaged in the case of negative surge.

SUMMARY

Embodiments of the present invention provide a surge protection circuit, which can reduce a clamping voltage of negative surge, to facilitate equipment model selection and prevent damage to an equipment caused by the negative surge.

To solve the foregoing technical problems, embodiments of the present invention adopt the following technical solutions:

a surge protection circuit, including: an input configured to provide direct current power supply, an output configured to connect to a next circuit, and a cutoff circuit connected to the output; the surge protection circuit further includes: a discharge circuit connected between the input and the cutoff circuit;

the discharge circuit includes: a diode and a field-effect transistor;

the cathode of the diode is connected to the positive end of the input, and the anode of the diode is connected to the source of the field-effect transistor; the gate of the field-effect transistor is connected to the positive end of the input, the drain of the field-effect transistor is connected to the negative end of the input, and the direction of a parasitic diode of the field-effect transistor is opposite to the direction of the diode.

In the surge protection circuit provided by the embodiments of the present invention, discharge of a negative surge current is implemented through the diode and the field-effect transistor; compared to the technology in the prior art that discharge of a surge current is implemented through a varistor resistor or a transient voltage suppressor, the surge protection circuit provided by the present invention can effectively suppress the clamping voltage of negative surge because the conduction voltage of the diode and the field-effect transistor is very low, thereby facilitating equipment model selection of the cutoff circuit and preventing damage to an equipment caused by the negative surge.

BRIEF DESCRIPTION OF DRAWINGS

To describe technical solutions in embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from the accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
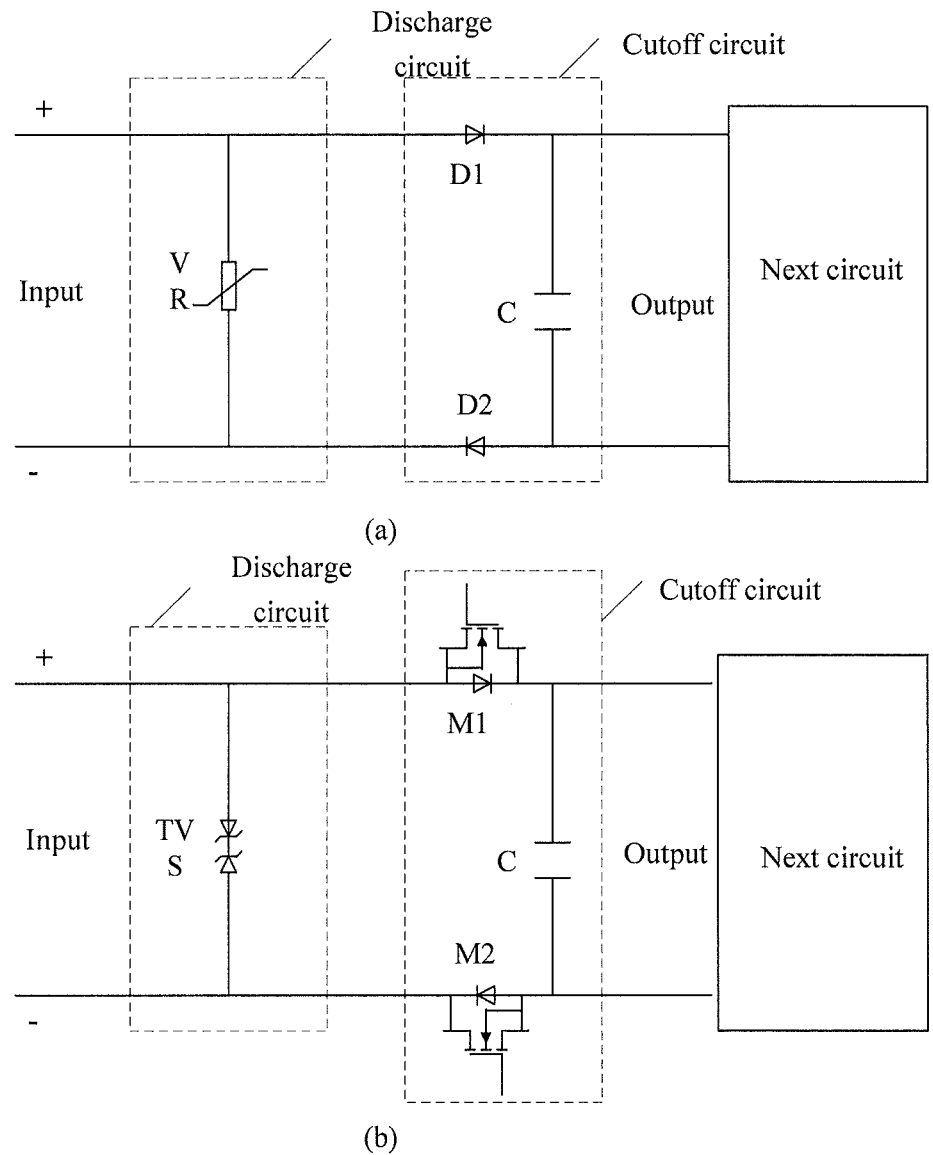
FIG. 1 is a schematic diagram of a surge protection circuit in the prior art.
Figure 2:
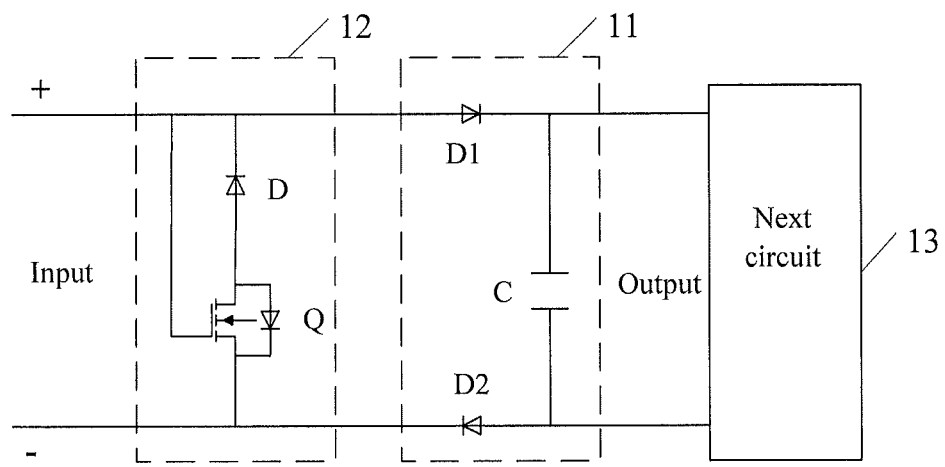
FIG. 2 is a schematic diagram of a surge protection circuit according to an embodiment of the present invention.

An embodiment of the present invention provides a surge protection circuit, as shown in FIG. 2, including: an input configured to provide direct current power supply, an output configured to connect to a next circuit 13, a cutoff circuit 11 connected to the output, and a discharge circuit 12 connected between the input and the cutoff circuit.

The discharge circuit 12 includes: a diode D and a field-effect transistor Q.

The cathode of the diode D is connected to the positive end of the input, and the anode of the diode D is connected to the source of the field-effect transistor Q; the gate of the field-effect transistor Q is connected to the positive end of the input, the drain of the field-effect transistor Q is connected to the negative end of the input, and the direction of a parasitic diode of the field-effect transistor Q is opposite to the direction of the diode D.

The input of the surge protection circuit includes two sides, that is, the positive end of the input and the negative end of the input, from which the power supply of the next circuit 13 comes; for example, the positive end of the input is connected to the positive end of a power supply, and the negative end of the input is connected to the negative end of the power supply. Correspondingly, the output of the surge protection circuit also includes two sides, that is, the positive end and the negative end, which are configured to connect to the next circuit 13 and provide power supply to the next circuit 13.

The cutoff circuit 11 is set between the discharge circuit 12 and the next circuit 13; reference can be made to the prior art for detailed composition of the cutoff circuit 11. For example, a diode D1 and a diode D2 are set between the discharge circuit 12 and the next circuit 13 and between the positive end and the negative end of the input, respectively, where the anode of D1 is connected to the positive end of the input, the cathode of D1 is connected to the positive end of the output, the anode of D2 is connected to the negative end of the output, and the cathode of D2 is connected to the negative end of the direct current input. A capacitor C may further be set between the diodes D1 and D2 and the next circuit, and two ends of the capacitor C are connected to the cathode of D1 and the anode of D2, respectively. Of course, the diodes D1 and D2 in the cutoff circuit 13 may also be replaced by field-effect transistors M1 and M2; connection directions of parasitic diodes of the field-effect transistors M1 and M2 are the same as connection directions of D1 and D2.

Specifically, the field-effect transistor Q in the discharge circuit 12 may be an N-metal-oxide-semiconductor (N-Metal-Oxide-Semiconductor, NMOS), and a connection direction of a parasitic diode of the field-effect transistor Q is opposite to a connection direction of the diode D. In an initial status, the field-effect transistor Q is not charged, and the field-effect transistor Q may have the function of anti-reverse connection; if the positive end and the negative end of the input are reversely connected, the parasitic diode of the field-effect transistor Q may be in a cut-off status, and no current flows through it, to prevent damage to an electronic equipment in the discharge circuit 12 caused by a high reverse current flowing into the discharge circuit 12, due to the reversed connection of the power supply at the input.

In the case of normal working, a diode in the cutoff circuit 11 is forward conductive, and the cutoff circuit 11 is in a turning-on status, which can normally provide power supply to the next circuit 13. The parasitic diode of the field-effect transistor Q is reversely cut off and no current flows through the discharge circuit 12. A forward voltage added between the gate and the grain of the field-effect transistor Q results in generation of electric potential between the gate and source of the field-effect transistor Q, to implement charging of the field-effect transistor Q. When negative surge occurs, a transient reverse voltage occurs in the surge protection circuit, diodes D1 and D2 in the cutoff circuit 11 are reversely cut off, and the cutoff circuit 11 implements a cutoff function, to prevent a negative surge current from entering the next circuit 13. At this time, because the field-effect transistor Q has been charged, it may discharge previously stored electric potential in the case of negative surge; the field-effect transistor Q turns into a conductive status, so that the negative surge current flows into the drain of the field-effect transistor Q, flows out of the source, and flows through the diode D, to finish discharge of the negative surge.

In the present embodiment, the field-effect transistor Q may be preferably a field-effect transistor with a high current and a low voltage, to provide a high discharge current and rapidly and effectively provide a discharge path for the negative surge, as well as to ensure low voltage, to clamp a voltage in the negative surge to a low value.

Figure 3:
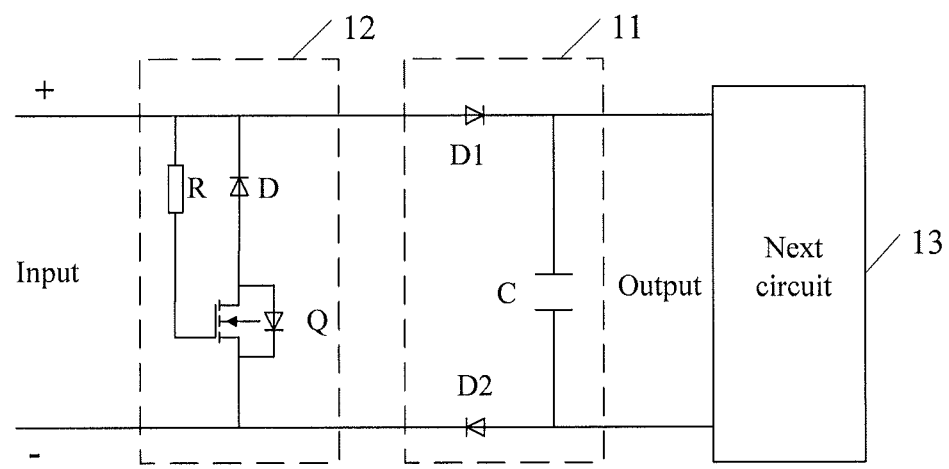
FIG. 3 is a schematic diagram of a surge protection circuit according to another embodiment of the present invention.

Further, optionally, as shown in FIG. 3, the discharge circuit 12 of the surge protection circuit further includes: a resistor R. The resistor R is connected between the gate of the field-effect transistor Q and the positive end of the input.

To prevent violent oscillation of the voltage between the gate and the drain of the field-effect transistor Q, a resistor R may be added between the gate of the field-effect transistor Q and the positive end of the input, which shares a part of voltage in the case of surge or an unstable voltage, to reduce the voltage withstood by the field-effect transistor Q, thereby achieving the effect of protecting the field-effect transistor Q.

Figure 4:
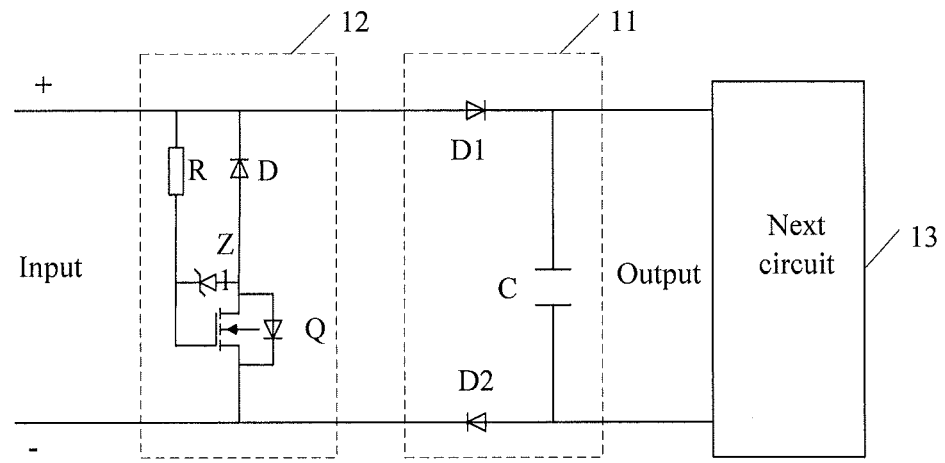
FIG. 4 is a schematic diagram of a surge protection circuit according to another embodiment of the present invention.

Further, optionally, as shown in FIG. 4, the discharge circuit 12 of the surge protection circuit further includes: a voltage regulator tube Z1. The voltage regulator tube Z1 is connected between the source and gate of the field-effect transistor Q.

The voltage regulator tube Z1 is added between the gate and drain of the field-effect transistor Q; the anode of the voltage regulator tube Z1 is connected to the source of the field-effect transistor Q, and the cathode of the voltage regulator tube Z1 is connected to the gate of the field-effect transistor Q, to clamp the voltage between the gate and the drain of the field-effect transistor Q to the working voltage of Z1. Because the voltage regulator tube Z1 can clamp the voltage between the gate and the drain of the field-effect transistor Q to a low voltage value, for example, the voltage between the gate and the drain e=60v, a value of the voltage input may have larger space for adjustment, for example, the voltage E between the positive end and the negative end of the input may be increased to 220 V.

Figure 5:
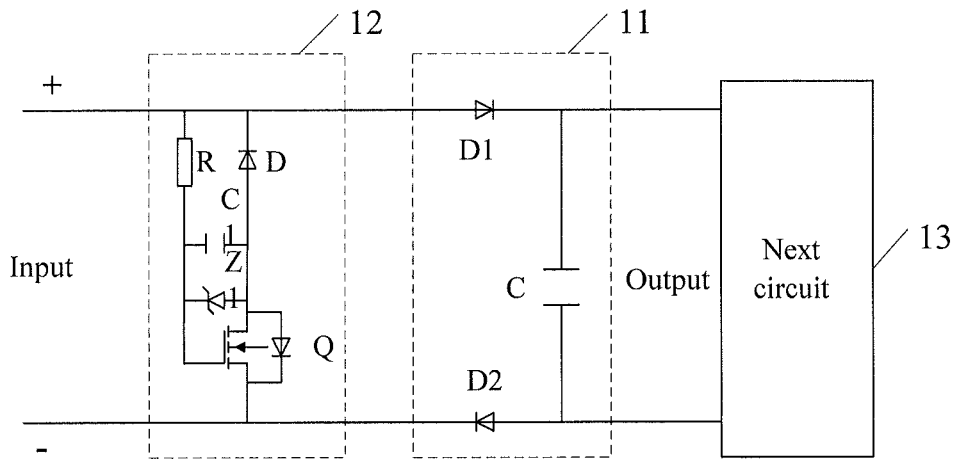
FIG. 5 is a schematic diagram of a surge protection circuit according to another embodiment of the present invention.

Further, optionally, as shown in FIG. 5, the discharge circuit 12 of the surge protection circuit further includes: a capacitor C1. The capacitor C1 is connected to the voltage regulator tube Z1 in parallel and connected between the source and gate of the field-effect transistor Q.

The capacitor C1 connected between the source and the gate of the field-effect tube Q may temporarily store the electronic potential which has been stored at normal working time and discharged by the field-effect transistor Q, to retard discharge of electronic potential between the gate and the source of the field-effect transistor Q, maintain the conductive status of the field-effect transistor Q, and extend the duration for the discharge circuit 12 to withstand negative surge, in order to fully discharge the negative surge and protect the next circuit 13.

In summary, through the artful connection between a diode and a field-effect transistor, the voltage (a clamping voltage) withstood by a cutoff circuit is a sum of the conduction voltage of the field-effect transistor Q and the forward conduction voltage of the diode D in the case of negative surge; for example, under the precondition that an input voltage is 220 V, if the conduction voltage of the field-effect transistor Q on which negative surge occurs is about 60 V, while the forward conduction voltage of the diode D is only 0.1 V, then, the clamping voltage may be controlled to a low voltage status at about 60.1v. In this way, a reliable discharge path is provided for the negative surge, and the voltage can be clamped to a very low value in the case of the negative surge, thereby decreasing the voltage specifications of a diode and a field-effect tube in a cutoff circuit, and decreasing the cost of a surge protection circuit.

In a surge protection circuit provided by the embodiment of the present invention, discharge of a negative surge current is implemented through a diode and a field-effect transistor; compared to the technology in the prior art that discharge of a surge current is implemented through a varistor resistor or a transient voltage suppressor, the surge protection circuit provided by the present invention can effectively suppress the clamping voltage of negative surge because the conduction voltage of the diode and the field-effect transistor is very low, thereby facilitating equipment model selection of the cutoff circuit and preventing damage to an equipment caused by the negative surge.

Through the foregoing description of the embodiments, it is clear to a person skilled in the art that the present invention may be implemented by software plus necessary universal hardware, and of course, may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer equipment (which may be a personal computer, a server, a network equipment, and the like) to execute the methods described in the embodiments of the present invention.

The foregoing description is merely about specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A surge protection circuit, comprising:
   an input configured to provide direct current power;
   an output configured to connect to a next circuit;
   a cutoff circuit connected to the output;
   a discharge circuit connected between the input and the cutoff circuit, the discharge circuit comprising:
   a diode, and
   a field-effect transistor; wherein
   the cathode of the diode is connected to the positive end of the input, and the anode of the diode is connected to the source of the field-effect transistor; the gate of the field-effect transistor is connected to the positive end of the input, the drain of the field-effect transistor is connected to the negative end of the input, and a direction of a parasitic diode of the field-effect transistor is opposite to a direction of the diode.

2. The surge protection circuit according to claim 1, wherein the discharge circuit further comprises: a resistor, connected between the gate of the field-effect transistor and the positive end of the input.

3. The surge protection circuit according to claim 2, wherein the discharge circuit further comprises: a voltage regulator tube, connected between the source and the gate of the field-effect transistor.

4. The surge protection circuit according to claim 3, wherein the discharge circuit further comprises:
   a capacitor, connected to the voltage regulator tube in parallel and connected between the source and the gate of the field-effect transistor.

* * * * *